United States Patent [19]

Einsle et al.

[11] Patent Number: 4,702,404
[45] Date of Patent: Oct. 27, 1987

[54] METHOD AND APPARATUS FOR REGULATING SPEED OF A LONGITUDINALLY MOVING FIBER

[75] Inventors: Guenter Einsle, Munich; Ernst Mayr, Starnberg, both of Fed. Rep. of Germany

[73] Assignee: Siemens Aktiengesellschaft, Berlin & Munich, Fed. Rep. of Germany

[21] Appl. No.: 711,359

[22] Filed: Mar. 13, 1985

[30] Foreign Application Priority Data

Mar. 14, 1984 [DE] Fed. Rep. of Germany ....... 3409376

[51] Int. Cl.$^4$ .......................... B65H 51/30; G02B 6/44
[52] U.S. Cl. ........................................... 226/7; 226/97; 350/96.20
[58] Field of Search ................................. 226/7, 95, 97; 242/147 A; 350/96.20, 96.21; 57/352

[56] References Cited

U.S. PATENT DOCUMENTS

| | | | |
|---|---|---|---|
| 2,302,790 | 11/1942 | Modigliani | 242/147 A |
| 2,971,243 | 2/1961 | Burns | 226/7 |
| 3,144,187 | 8/1964 | Naumann | 226/95 |
| 3,645,431 | 2/1972 | Harrison | 226/7 X |
| 3,944,166 | 3/1976 | Hermanns | 242/147 A |
| 4,030,810 | 6/1977 | Khoe | 350/96.21 X |
| 4,414,165 | 11/1983 | Oestreich et al. | . |
| 4,458,476 | 10/1984 | Mayr et al. | 57/294 |

FOREIGN PATENT DOCUMENTS

2444973  4/1975  Fed. Rep. of Germany ... 242/147 A

Primary Examiner—Stuart S. Levy
Assistant Examiner—Lynn M. Sohacki
Attorney, Agent, or Firm—Hill, Van Santen, Steadman & Simpson

[57] ABSTRACT

A method and apparatus for precisely regulating the speed of movement of a sensitive fiber in a substantially contact-free manner. The method and apparatus may be used for applying a braking force to a fiber or for accelerating the fiber. The method and apparatus comprise providing at least two capillary tubes having bores of different inside diameters with the bores being axially aligned, introducing a flowing medium such as gas or a more viscous material into the interior of the capillary tubes to flow out the free ends with the majority of the medium flowing out the capillary tube having the larger diameter, moving the fiber axially through the two capillary tubes so that the flow of the medium in the bore of the capillary tube having the larger inside diameter creates a force applied in a direction of the flow to the fiber. If the fiber is moving in the direction of the flow, this force acts to accelerate the fiber and if the fiber is moving in the opposite direction, this force acts to decelerate the fiber.

13 Claims, 2 Drawing Figures

METHOD AND APPARATUS FOR REGULATING SPEED OF A LONGITUDINALLY MOVING FIBER

BACKGROUND OF THE INVENTION

The present invention is directed to a method of regulating speed of a longitudinally or axially moving fiber particularly a light waveguide as well as to an apparatus for implementation of the method.

Speed regulating methods are utilized, for example, in the manufacture of light waveguide cables. After a glass fiber has been drawn, additional worksteps are performed on the fiber such as providing a protective cladding, injecting the fiber with a filling compound into a sheath and/or stranding a plurality of fibers to form a cable. In order to take a greater coefficient of thermal expansion of the cladding compared to the light waveguide into consideration, the latter is shot in with a precise metered excess length. A German published application OS DE No. 31 11 963 shows an example of such a manufacturing process. The significance of an exactly meterable braking effect in conjunction with the shrinkage during cooling clearly proceeds from this published application. However, at the beginning of the manufacturing process, the light waveguide is only slightly protected. Mechanical stresses can easily cause additional attenuations. One must therefore proceed with extreme caution in the regulation of the speed of movement of the fiber. At present, magnetic, disk and felt brakes and the like are utilized as braking devices.

However, these types of braking devices have yet other disadvantages. Fibers of any type that are drawn off overhead are easily twisted. Brakes that do not function contact-free tend to back up the twist, and when working with sensitive fibers such as, for example, light waveguides, there is a risk that they will tear. Given more flexible fibers, this backup of the twist can lead to a loop formation which is also undesirable.

SUMMARY OF THE INVENTION

The object of the present invention is to provide a method as well as an apparatus for implementing the method wherein a fine regulation of the running speed of a fiber is combined with the optimum preservation of the fiber and which method and apparatus is capable of forwarding a twist under given conditions.

To accomplish these goals, the method of regulating the speed of an axially moving fiber, particularly a light waveguide fiber, comprises the steps of conducting the axially moving fiber through two capillary tubes having axial aligned bores with a different inside diameter, applying a flowing medium under pressure to the interior of each of the bores to flow out the opposite end of the tube with the majority of the medium flowing from the end of the capillary tube having a bore with a larger inside diameter to create a force on the fiber in the direction of flow of the medium in said capillary tube with the bore having the larger inside diameter.

Since this guidance is practically contact-free, in this particular way, general guidance of the fiber is guaranteed on the one hand and on the other hand the braking or deceleration effect can be very finely controlled. Over and above this, if a twist does exist in the fiber, there is no buildup of the twist to a breaking or tearing point.

The apparatus for applying the axially directed force comprises at least two capillary tubes with each tube having a bore with the bore of one tube having an inside diameter larger than the inside diameter of the bore of the other tube, means for holding the capillary tubes with the bores being axially aligned and means for introducing a flowing medium under pressure into the axial aligned bores to flow out the opposite ends with the greater amount of flow being in the bore of said one tube to create an axially directed force on a fiber in said one tube in a direction of the flow of the medium in the one tube.

It should be noted that both the method and the apparatus as described hereinabove provides a way of regulating the speed such as by decelerating a fiber; however, the method and apparatus can also be utilized for accelerating the fiber. In other words, if the fiber is moving first into the capillary tube having the larger bore and then into the capillary tube having the bore of the smaller inside diameter, a braking or deceleration force will be created. However, if the fiber is moving first into the tube having the bore with the smaller inside diameter and then into the bore having the larger inside diameter, then the force exerted by the flow of medium in the bore will accelerate the movement of the fiber.

The flowing medium depending on the amount of force being applied can be a gaseous medium such as compressed air or can be another fluid such as a liquid or flowable jelly such as a selected from a group consisting of a silicone mixture and paraffin. When utilizing compressed air, the means for introducing may include a regulating valve for regulating the pressure of the gaseous medium. When utilizing a flowable or viscous liquid, the means for introducing may also include pump means for creating the flow of the fluid under pressure.

DESCRIPTION OF THE PREFERRED EMBODIMENTS

Figure 1:
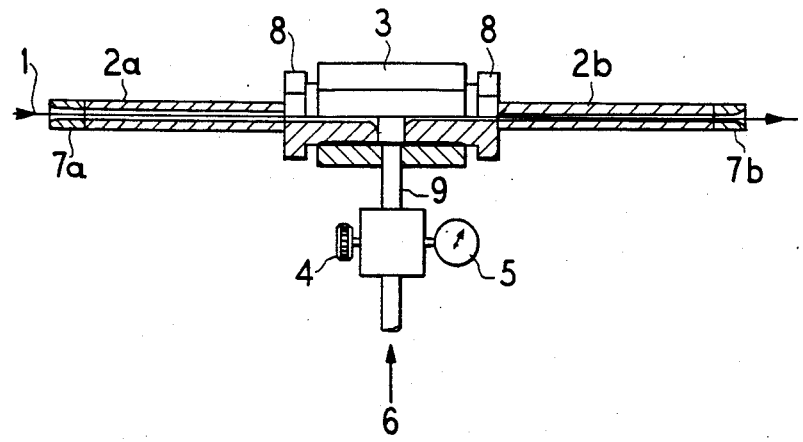
FIG. 1 is a side view with portions broken away for purposes of illustration of an apparatus of the present invention for performing the method of the present invention.

The principles of the present invention are particularly useful when incorporated in an apparatus such as illustrated in the Figure, which apparatus enables regulating the speed of an optical fiber or light waveguide 1 which is being drawn off overhead from a supply reel, is being provided with a twist and is moving in the direction of the arrows from left to right in the Figure.

A braking effect is achieved on the optical fiber 1 with the apparatus which includes a capillary tube 2a having a bore with a larger inside diameter than a capillary tube 2b which has a bore with a smaller inside diameter. On an entrance end for the fiber 1, the capillary tube 2a is provided with a funnel-shaped neck 7a so that the waveguide can be introduced undamaged. As illustrated, the funnel-shaped neck 7a basically has an entrance passageway that converges to the diameter of the bore of the capillary tube 2a. In a similar manner, the capillary tube 2b on an exit end is provided with a similar funnel-shaped neck 7b. While both necks 7a and 7b are illustrated as separate members, the bore of each tube 2a and 2b could be spread or diverge to provide an integral funnel-shaped end.

The capillary tubes 2a and 2b are held by means so that the internal bores are axially aligned. The means is illustrated as a chamber member or chamber 3 which receives threaded nuts 8 that hold each of the capillary tubes in the chamber 3 with the bores being axially aligned. Chamber 3 also includes means for introducing a flowing medium. As illustrated, the chamber 3 receives a discharge from a tube or feed 9, which discharges into the center of the chamber 3 so that the medium can flow through each of the capillary tubes 2a and 2b and be discharged out of their necks 7a and 7b. As illustrated, the flowing medium can be from a source 6 flowing in the direction of the arrow and passes through a needle valve 4 which regulates the pressure and into the tube 9. The monitoring of the pressure can be determined by a pressure indicator or manometer 5. When using a gaseous medium such as compressed air from the source 6, the majority of the compressed air will escape through the capillary tubes 2a because it offers less flow resistance to the compressed air than the capillary tube 2b which has the bore of the smaller diameter. Due to turbulence along the surface of the fiber, the compressed air flowing opposite to the direction of movement of the fiber will create an axially directed force in a direction opposite to the direction of movement of the fiber to gently decelerate the fiber as it passes through the device. The quantity of the air flowing through the device can be regulated by the needle valve 4 and thus the level of the axial force which in this particular case is a braking force can be adjusted. The feed pressure lies roughly in a range of 1 to 15 bars. By controlling the flow in the capillary tubes, the amount of the force can be regulated to an amount of 0.01 Newton.

In an exemplary embodiment, the fiber 1 will have a diameter of 0.3 mm. The capillary tube 2a will have a bore of an inside diameter of 0.6 mm as well as an outside diameter of approximately 1 mm. The tube 2b will have a bore with an inside diameter of 0.4 mm with an outside diameter which corresponds to the diameter of the tube 2a. Each of the tubes 2a and 2b will have a respective length of 100 mm which includes the tips or necks 7a and 7b as well as the threaded nuts 8. The specific dimensions are only by way of an example and can also be variable relative to one another. However, the diameter of the fiber should be in a range of 10 to 70% smaller than the inside diameter of the bore of the capillary tubes 2a and 2b so that the desired effect of the compressed air 6 is maintained. The thickness of the capillary tubes 2a and 2b is not shown to scale in the Figure. After the speed adjustment has been carried out, the light waveguide is supplied from the device to equipment for performing further manufacturing processes, for example, a bundling device (not illustrated).

Figure 2:
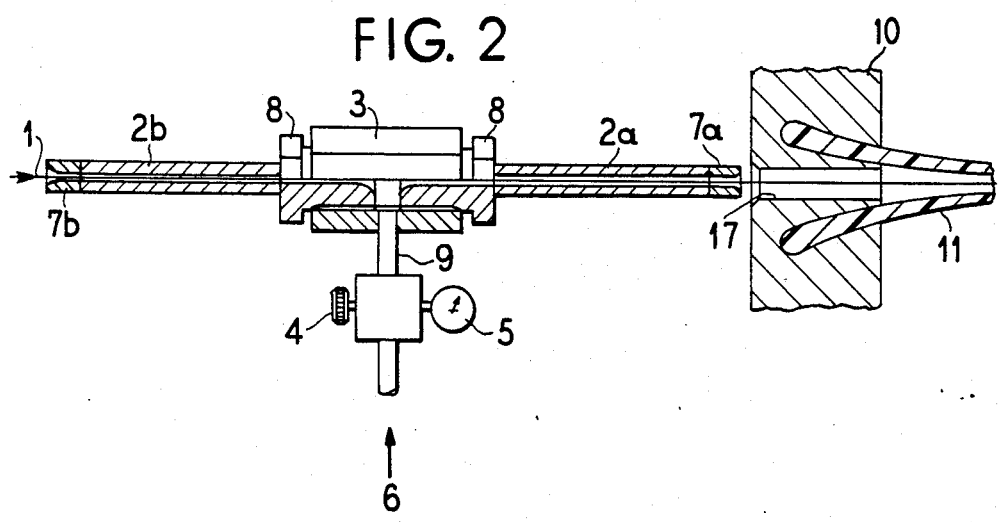
FIG. 2 is a side view with portions broken away for purposes of illustration of the apparatus being used to insert a waveguide in a sheath which is being extruded.

Another application of the device and method of the present invention is to utilize the device to aid when shooting a glass fiber into a lead sheath 11, which is being provided by an extruder 10 having a bore 17 (FIG. 2). In such arrangement, the device and method are utilized to create an excess length or when compensating for the fiber slip when filling the sheath with a known filling compound. In this case, the running direction of the light waveguide 1 is reversed from the direction indicated by the arrows in the FIG. 1. In other words, the fiber moves from the tube 2b (FIG. 2) with the bore with the smaller diameter to the tube 2a which has the bore with the larger inside diameter. Thus, the regulated flow of air passing along the tube 2a acts as an acceleration force. It should be noted that the direction of application of force can be changed by removing the two tubes 2a and 2b by utilizing the threaded nuts 8 and reversing their positions.

The range of adjustments of the fiber running speed are also expanded if not only the pressure of the compressed air is regulated but also if the bores of each of the capillary tubes 2a and 2b are further modified. Thus, by increasing the ratio of the difference between the inside diameter of the bore for the tube 2a and the inside diameter of the bore for the tube 2b, the degree of force can be changed.

Another possibility for execution of the apparatus of the invention is a combination of two capillary tubes 2a and 2b into a single tube having two different bores, which bores are axially aligned. In order to achieve the best efficiency, the compressed air is likewise introduced here at the transition between the two bores of different diameters. A simple structure is achieved by means of this apparatus although it does reduce the flexibility of the device.

When higher braking or acceleration forces are desirable, it can be advantageous to employ a dense medium instead of compressed air or gas. For example, by utilizing a flowing medium such as the fiber-filling compound, for example, which is formed of paraffin or a silicone mixture. In such an instance, the needle valve 4 is then replaced, for example, by a speed-governed gear pump. The manipulation and regulation of the flowing medium is thus controlled by the pump. In this case, the range of the transmitted forces extends from about 0.1 to 1 Newton.

Although various minor modifications may be suggested by those versed in the art, it should be understood that we wish to embody within the scope of the patent granted hereon, all such modifications as reasonably and properly come within the scope of our contribution to the art.

We claim:

1. A method for regulating the speed of an axially moving optical waveguid as the waveguide is inserted into a leas sheath, said method comprising the steps of conducting the axially moving optical waveguide through two capillary tubes having axially aligned bores with a different inside diameter and through a chamber member being interposed between the two capillary tubes, applying a flowing medium, which is a viscous liquid acting as a filling compound for the waveguide, under pressure to the interior of the chamber member with the medium flowing in opposite directions through the bores of the two capillary tubes and flowing out of the opposite opened ends of the tubes with the majority of the medium flowing from an outer end of the capillary tube having the bore with the larger inside diameter to create a force on the optical waveguide in the direction of the flow of the medium in said capillary tube with the bore with the larger inside diameter to shoot the waveguide and filling compound into the lead sheath.

2. A method according to claim 1, wherein in order to create an accelerating force on the waveguide, the waveguide is first conducted through the capillary tubes in a direction to pass through the capillary tube having a bore with the smaller diameter and then through the capillary tube having the bore with the larger inside diameter.

3. A method according to claim 2, which includes steps of producing a lead sheath adjacent the outer end of the capillary tube with the bore with the larger inside diameter at a speed less than a speed of the waveguide leaving the outer end so that the waveguide is shot from the capillary tubes and inserted into the lead sheath with an excess length in comparison to the length of the lead sheath.

4. An apparatus for applying an axially directed force on an optical waveguide moving along its axis, said apparatus comprising at least two capillary tubes each having a bore with the bore of one tube having an inside diameter larger than the inside diameter of the bore of the other tube, means for holding the capillary tubes with the bores being axially aligned including a chamber member being interposed between said capillary tubes and means for introducing a flowing viscous liquid into the chamber member under pressure to flow into the axially aligned bores and out the opposite ends of the capillary tubes with the greater flow being in the bore of said one tube with the larger inside diameter to create an axially directed force on the optical waveguide in a directin of flow of the liquid in the one tube.

5. An apparatus according to claim 4, wherein each of the capillary tubes at their opposite free ends has end a diverging funnel-like entrance region.

6. An apparatus according to claim 5, wherein the funnel-like entrance region comprises a funnel-like neck piece attached to the free end of the capillary tube.

7. An apparatus according to claim 4, wherein the diameter of the waveguide and the inside diameter of the bores of the two capillary tubes are selected so that the diameter of the waveguide is preferably in a range of 10 to 70% smaller than the inside diameters of the bores of the capillary tubes.

8. An apparatus according to claim 4, wherein the means for introducing a flowing viscous liquid includes a tube secured in said chamber member to iintroduce the liquid to the interior thereof.

9. An apparatus according to claim 8, wherein the means for holding includes means for releasably holding the ends of each of the capillary tubes in the chamber member.

10. An apparatus according to claim 9, wherein the means for releasably holding comprise threaded nuts for securing the capillary tube in the chamber member.

11. An apparatus according to claim 8, wherein said chamber member is a one-piece member.

12. An apparatus according to claim 4, wherein the means for introducing a flowing medium include a fine metering valve for regulating the pressure of the flowing medium and a pressure indicator for monitoring the pressure.

13. A method for regulating the speed of an axially moving optical waveguide, said method comprising the steps of conducting the axially moving optical waveguide through two capillary tubes having axially aligned bores with a different inside diameter and through a chamber member being interposed between the two capillary tubes, applying a flowing medium under pressure to the interior of the chamber member with the medium flowing in opposite directions through the bores of the two capillary tubes and flowing out of the opposite opened ends of the tubes with the majority of the medium flowing from the end of the capillary tube having the bore with the larger inside diameter to create a force on the optical waveguide in the direction of the flow of the medium in said capillary tube with the bore with the larger inside diameter, said flowing medium being a free flowing compound selected from a group of materials consisting of a silicone mixture and a paraffin mixture.

* * * * *